Patented Oct. 21, 1941

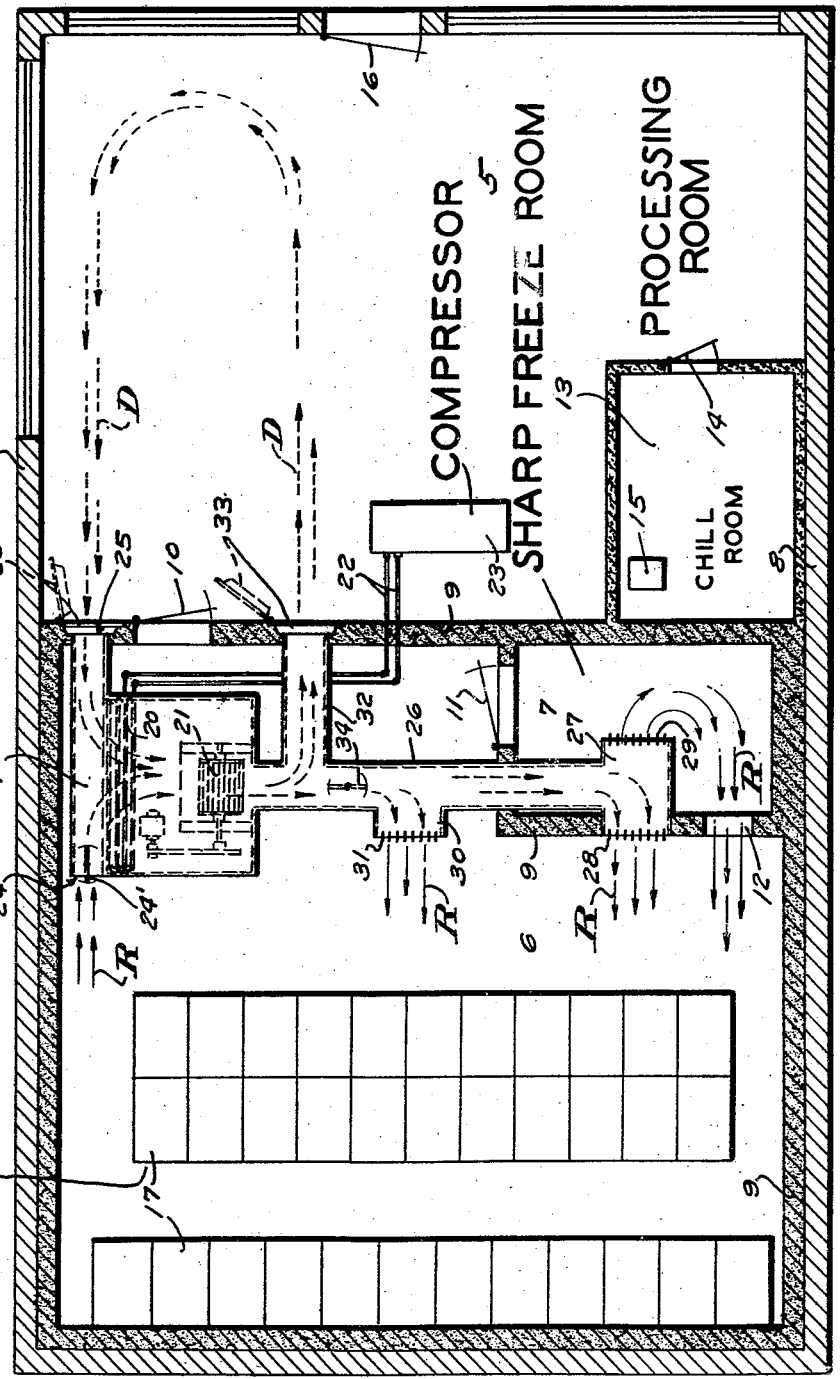

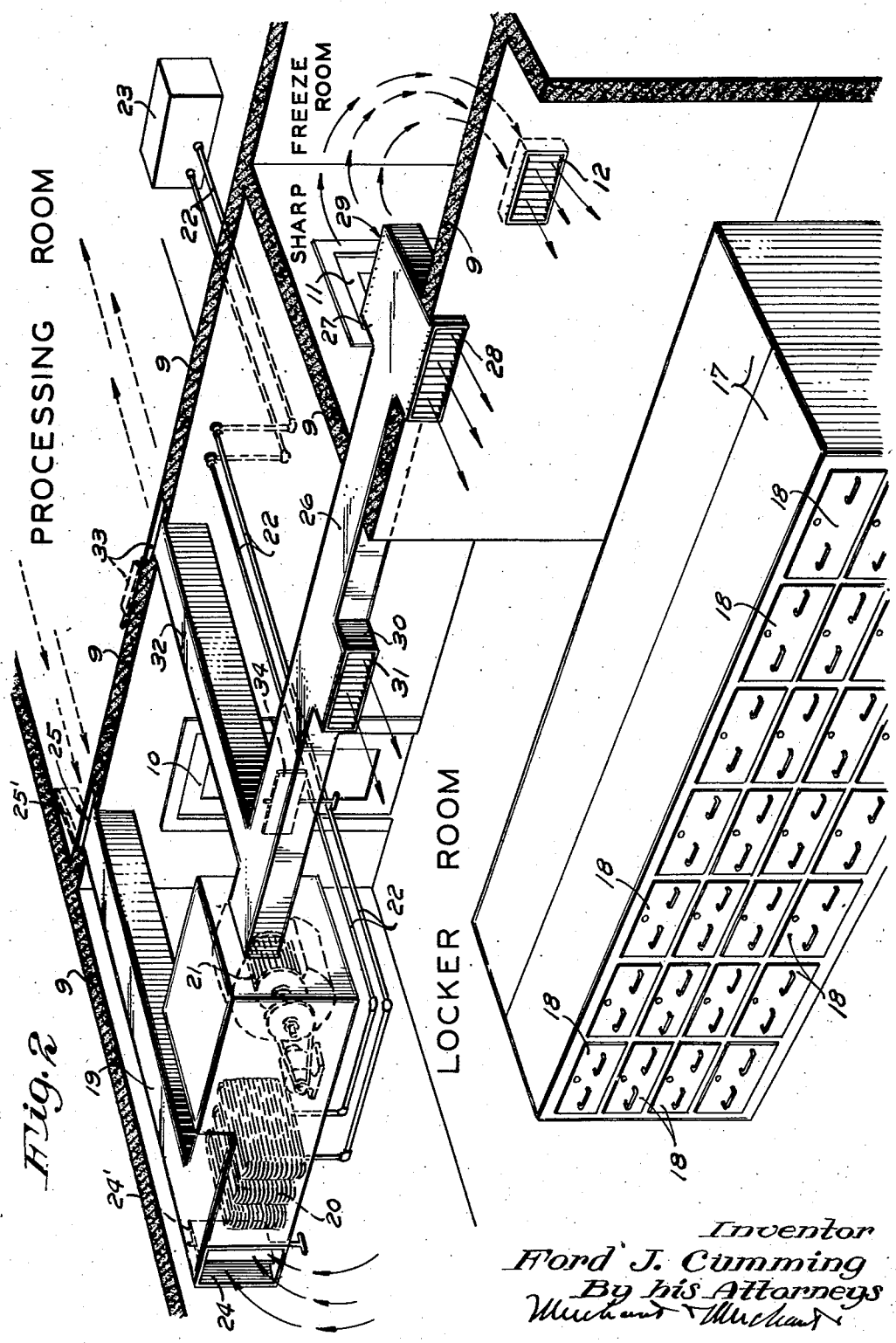

2,259,803

UNITED STATES PATENT OFFICE 2,259,803

REFRIGERATING PLANT

Ford J. Cumming, Hopkins, Minn.

Application March 10, 1939, Serial No. 260,993

8 Claims. (Cl. 62—102)

Generally stated, this invention relates to improvements in refrigerated cold storage plants of the type wherein perishable articles, usually food products such as meat, are brought by individual customers to be frozen and stored in frozen condition for future use. Such refrigerated cold storage plants customarily include a relatively large cold storage room in which a large number of lockers for individual customer use are located, and wherein the air is refrigerated to below freezing temperatures; an associated relatively small sharp freeze room for freezing of the perishable products prior to removal to the cold storage room and wherein it is desired to maintain a below-freezing temperature considerably lower than that in the cold storage room, so that products will be rapidly frozen; and an associated relatively warm room, usually referred to as a processing room, for preparing the products for freezing in the sharp freeze room and in which processing room temperatures are maintained above freezing temperature.

Some of the plants of the character described employ mechanical refrigerating systems whereby the cold storage and sharp freeze rooms are cooled from common low temperature heat exchange devices that require periodical defrosting and are defrosted by the thawing or melting process, and it is particularly toward the improvement of plants involving such refrigerating systems that this invention is directed.

More specifically stated, it may be said that the present invention provides improved methods and apparatus whereby the cold storage and sharp freeze rooms of plants of the kind described may be cooled during normal operating periods to predetermined different freezing temperatures by common heat exchange devices and whereby the common heat exchange devices of such plants may be quickly and inexpensively defrosted periodically by the melting or thawing process without causing or allowing serious rise in temperature in either the cold storage rooms or sharp freezing rooms. In accordance with the invention the above highly important objectives are attained in the following manner, to wit:

The common low temperature heat exchanger is used to cool both the cold storage room and the sharp freeze room. During normal operating or refrigerating periods the air from the cold storage room is force-circulated over the common low temperature heat exchanger from and back to the cold storage room, at least a sufficient predetermined portion of this cooled air from the low temperature heat exchanger, to cool the sharp freeze room to a lower temperature than the cold storage room, being delivered directly to the sharp freeze room and from thence to the cold storage room.

With the preferred apparatus, herein illustrated, means is provided whereby all or any desired proportion of the air from the low temperature heat exchanger may be delivered first to the sharp freeze room and from thence back to the cold storage room, so as to permit a wide selection of temperature differences between the sharp freeze room and the cold storage room. For periodically defrosting the low temperature heat exchanger, the said forced circulation of air from the refrigerated rooms over the low temperature heat exchanger and the forced circulation of air from the sharp freeze room to the cold storage room is interrupted, and a forced circulation of warm air over the low temperature heat exchanger is established from and back to an associated room wherein the temperature is maintained above freezing temperature and at a temperature at which frost and ice are rapidly melted. Preferably, and as herein illustrated, the warm air for defrosting purposes is taken from the processing room in which, processing room, the heat radiating compressor unit for the low temperature heat exchanger is preferably located and, when so located, will materially aid in maintaining a relatively high temperature.

The improved method hereof, together with the above and other important objectives, will further be made apparent from the following description and operation of the preferred embodiment of the invention illustrated in the accompanying drawings, wherein like characters indicate like parts throughout the several views.

Referring to the drawings:

Fig. 1 is a view partly in plan and partly in horizontal section illustrating the invention; and Fig. 2 is a perspective with some parts sectioned showing the interior of the various rooms or compartments and illustrating the preferred application of the air conduits or conductors and refrigerating elements or units.

In the drawings a processing room 5, a cold storage locker room 6 and a sharp freeze room 7 are formed within a suitable housing 8. The walls of the rooms or compartments 6 and 7 are lined or formed of heavy insulating material 9. From the processing room 5 a door 10 leads into the cold storage locker room 6; and from the cold storage locker room 6 a door 11 leads into the sharp freeze room 7, the latter being provided with a cold air outlet port or passage 12 for the discharge of cold air into said cold storage locker room. Usually but not always a chill room 13 is associated with the processing room 5 and, as shown, this chill room is provided with a door 14. The numeral 15 indicates a cold air blower of any suitable well known construction which will be arranged to discharge cool air into the chill room.

The processing room 5, as shown, is provided with an outside door 16.

The numeral 17 indicates individual lockers or storage compartments located in the cold storage locker room. These lockers may be of the well known construction provided with removable drawers 18 and usually provided with key-actuated locks.

Before describing the means for producing and cooling the temperatures and for defrosting, it may be stated that the following are approximately the temperatures that it will be desirable to maintain in the several rooms or compartments, to wit: in the processing room approximately 75° F.; in the chill room 13 approximately 34° F.; in the cold storage locker room a temperature of approximately 10° above zero; and in the sharp freeze room a temperature of approximately zero. Of course, these temperatures may be varied, but the above indicate approximately about the relative temperatures that it is desired to maintain.

The main low temperature unit as shown involves a box-like casing 19 in which is located a low temperature heat exchanger consisting of a refrigerating coil, and a motor driven blower or fan 21. The heat exchanger 20 is shown as supplied with refrigerating fluid through pipes 22 leading from a suitable compressor 23. The casing 19 is preferably hung high or near the ceiling in the cold storage locker room 6 and is provided with two air intake ports or passages 24 and 25 adapted to be opened and closed at will by valves or closures 24' and 25'. Also, the casing is provided with a main cold air or discharge passage formed by a pipe or conduit 26 that leads into the sharp freeze room 7 and which at its extended end is provided with a head 27 that is closed except for dampers or louvers 28 and 29. The cold air pipe 26 is also shown as provided outside of the room 7 with a discharge neck 30 that opens directly into the room 6 and is adapted to be opened and closed by louvers 31. The louvers 28, 29 and 31, which serve as valve means, are preferably of the well known pivoted blade type which operate when turned together to close the respective air passages but, which when turned as shown in the drawings, permit free discharge of air.

The pipe 26 is provided with a branch discharge pipe 32 that leads into the processing room 5 and which is adapted to be opened and closed at will by a damper or valve-acting closure 33. Located in the main pipe 26 beyond the branch pipe 32 is a normally open valve-acting damper 34. The closures 25' and 33, as shown, are pivoted door-like elements but might take other form.

The use of the device or system will usually be as follows:

The person or concern who brings in the meat for storage will take the same into the processing room where it will be cut up. If the chill room 13 is provided, the cut meat will then be taken into the chill room and its temperature reduced nearly but not quite to the freezing point. From the room 13 the chilled meat will be taken into the sharp freeze room 7 where its temperature will be reduced, as above stated, to about zero. From the room 7 the meat will be placed in the locker of the person owning the meat and will be there stored until the owner desires to remove the same. In the locker the meat will be maintained at a temperature far below the freezing point and, as above indicated, usually about ten degrees above zero.

For maintaining the temperatures above indicated, the valves or doors 25' and 33 will, of course, be kept closed. The louvers or dampers opening from the pipe 26 will be left open so that cold air will be first delivered at its lowest temperature in the sharp freeze room 7 and from which room 7 the air will pass into the locker room 6 where its temperature will be somewhat raised. Some times the louvers 28 and 31 will be closed so that all of the cold air passing into the locker room must first pass through this freeze room 7; but at other times the louvers 28 and 31, one or the other, will be opened. This manipulation of the valve-acting louvers will be regulated to get approximately the temperatures indicated. In any event, however, the cold air will be delievered into the freeze room 7 and from thence into the locker room. In this arrangement the coldest temperature can always be maintained in the freeze room 7 and the relatively warm air from the locker room will not be passed back or directly into this freeze room. Under the operations just described, the cut-off valve 34 will of course remain open as indicated in the drawings.

For defrosting, the valve 24' and the cut-off valve 34 will be closed, and the valve-acting closures 25' and 33 will be opened; and, of course, the door 10 should be kept closed. When this arrangement of valves or dampers is made, the compressor 23 should be stopped to temporarily discontinue the circulation of the refrigerating medium through the coil 20 of the low temperature heat exchanger; and the relatively warm air from the room 5 will then be rapidly circulated through the coil, thereby causing defrosting of the coil in a very short time and without letting any of the warm air into the rooms 6 and 7. The flow of the air for defrosting is indicated by arrows marked D; and the flow of air for producing the low temperature in the rooms 6 and 7 is indicated by the letter R.

Neither in the refrigerating operation nor in the defrosting operation is air delivered from the interior of processing room 5 into the cold temperature rooms 6 or 7 or conversely. In this way the low temperature of the cold temperature rooms is maintained while defrosting is being quickly accomplished. The defrosting is accomplished by taking air from and back into the relatively warm processing room where the lower temperature is rapidly absorbed and without objectionably chilling the processing room. The compressor 23 should, of course, be stopped or cut out of action during the defrosting operation.

Some of the terms are herein used in a broad sense. For example, the "cold storage" room is the place where the frozen meat or articles will be stored for future use. The term "processing room" is used to describe a relatively warm room where the meat or other articles are prepared for freezing and storage. The "sharp freeze" room is a place where the meat or other articles are quickly frozen to a low degree for subsequent storage in the cold storage room which will usually contain the lockers.

What I claim is:

1. The method of refrigerating a cold storage plant, wherein there is a relatively large cold storage room for storage of frozen perishable articles and a relatively small sharp freeze room for fast freezing of perishable articles preparatory to being placed in the cold storage room and a relatively warm room in which the temperature is maintained above freezing, which includes refrigerating the cold storage room to below freezing temperature and the sharp freeze room to a lower temperature by establishing a forced circulation of air from the cold storage room over a low tempreature heat exchanger and from the heat exchanger directly into the sharp freeze room and from thence back to the cold storage room, and periodically defrosting the heat exchanger by interrupting said forced circulation of cold storage room air over the low temperature heat exchanger and through the sharp freeze room and establishing a forced circulation of warm air above freezing temperature over the heat exchanger from and back to said relatively warm room and to the exclusion of air from the cold storage room and sharp freeze room.

2. The method of refrigerating a cold storage plant, wherein there is a relatively large cold storage room for storage of frozen perishable articles and a relatively small sharp freeze room for fast freezing of perishable articles preparatory to being placed in the cold storage room and a processing room for preparation of perishable articles for fast freezing and cold storage in which the temperature is maintained above freezing temperature, which includes refrigerating the cold storage room to below freezing temperature and the sharp freeze room to a lower freezing temperature by establishing a forced circulation of air from the cold storage room over a low temperature heat exchanger and from the heat exchanger directly into the sharp freeze room and from thence back to the cold storage room, and periodically defrosting the low temperature heat exchanger by interrupting said forced circulation of cold storage room air over the low temperature heat exchanger and through the sharp freeze room and establishing a forced circulation of warm air above freezing temperature over the heat exchanger from and back to the warm processing room and to the exclusion of air from the cold storage room.

3. The method of refrigerating a cold storage plant, wherein there is a relatively large cold storage room for storage of frozen perishable articles and a relatively small sharp freeze room for fast freezing of perishable articles preparatory to being placed in the cold storage room and a relatively warm room in which the temperature is maintained above freezing, which includes refrigerating the cold storage room to below freezing temperature and the sharp freeze room to a lower temperature by establishing a forced circulation of air from the cold storage room over a low temperature heat exchanger and delivering a predetermined proportion of the cooled force-circulated air from the low temperature heat exchanger directly back to the cold storage room and delivering another predetermined proportion of said cooled air directly to the sharp freeze room and from thence back to the cold storage room, and periodically defrosting the heat exchanger by interrupting said forced circulation of refrigerated room air over the low temperature heat exchanger and through the sharp freeze room and establishing a forced circulation of warm air above freezing temperature over the heat exchanger from and back to said relatively warm room and to the excluison of air from the cold storage and sharp freeze room.

4. The method of refrgieration in a cold storage plant wherein there is a relatively large cold storage room for storage of frozen perishable articles and a relatively small sharp freeze room for fast freezing of perishable articles preparatory to being placed in the cold storage room and a processing room for preparation of perishable articles for fast freezing and cold storage in which the temperature is maintained above freezing temperature, which includes refrigerating the cold storage room to below freezing temperature and the sharp freeez room to a predetermined lower freezing temperature by establishing a forced circulation of air from the cold storage room over a low temperature heat exchanger and delivering a predetermined proportion of the cooled force circulated air from the low temperature heat exchanger directly back to the cold storage room and delivering another predetermined proportion of said cooled air directly into the sharp freeze room and from thence back to the cold storage room, and periodically defrosting the low temperature heat exchanger by interrupting said forced circulation of air over the low temperature heat exchanger and through the sharp freeze room and establishing a forced circulation of warm air above freezing temperature over the heat exchanger from and back to the warm processing room and to the exclusion of air from the cold storage room.

5. In a cold storage locker plant of the kind described, a relatively large cold storage room to be maintained at temperatures below freezing, a relatively small sharp freeze room to be maintained at freezing temperatures below the freezing temperatures in the cold storage room and wherein articles are placed for fast freezing prior to removal to the cold storage room, a relatively warm room wherein temperatures are maintained above freezing, a refrigerating unit involving a low temperature heat exchange device and a casing enclosing said heat exchange device, blower means for forcing air through the said casing, air delivery passages leading from said refrigerating casing and opening one into the sharp freeze room and another into the high temperature room, air return passages leading to the casing one from the cold storage room and the other from the high temperature room, an air outlet passage leading from the sharp freeze room to the cold storage room, and valve means for selectively opening and closing each of the said air delivery passages and the said air return passages leading to the casing from the cold storage room and high temperature room.

6. In a cold storage locker plant of the kind described, a relatively large cold storage room to be maintained at temperatures below freezing, a relatively small sharp freeze room to be maintained at freezing temperatures below the freezing temperatures in the cold storage room and wherein articles are placed for fast freezing prior to removal to the cold storage room, a processing room wherein articles are prepared for freezing in the sharp freeze room and wherein temperatures are maintained above freezing, a refrigerating unit involving a low temperature heat exchange device and a casing enclosing said heat exchange device, blower means for forcing air through the said casing, air delivery passages leading from said refrigerating casing and opening one into the sharp freeze room and another into the high temperature processing room, air return passages leading to the casing one from the cold storage room and the other from the high temperature processing room, an air outlet passage leading from the sharp freeze room to the cold storage room, and valve means for selectively opening and closing the said air delivery passage and the said air return passage leading to the casing from the cold storage room and high temperature processing room.

7. In a cold storage locker plant of the kind described, a relatively large cold storage room to be maintained at temperatures below freezing, a relatively small sharp freeze room to be maintained at freezing temperatures below the freezing temperatures in the cold storage room and wherein articles are placed for fast freezing prior to removal to the cold storage room, a relatively warm room wherein temperatures are maintained above freezing, a refrigerating unit involving a low temperature heat exchange device and a casing enclosing said heat exchange device, blower means for forcing air through the said casing, air delivery passages leading from said refrigerating casing and opening one into the cold storage room and another into the sharp freeze room and another into the high temperature room, air return passages leading to the casing one from the cold storage room and the other from the high temperature room, an air outlet passage leading from the sharp freeze room to the cold storage room, and valve means for selectively opening and closing each of the said air delivery passages and the said air return passages leading to the casing from the cold storage room and high temperature room.

8. In a cold storage locker plant of the kind described, a relatively large cold storage room to be maintained at temperatures below freezing, a relatively small sharp freeze room to be maintained at freezing temperatures below the freezing temperatures in the cold storage room and wherein articles are placed for fast freezing prior to removal to the cold storage room, a processing room wherein articles are prepared for freezing in the sharp freeze room and wherein temperatures are maintained above freezing, a refrigerating unit involving a low temperature heat exchange device and a casing enclosing said heat exchange device, blower means for forcing air through the said casing, air delivery passages leading from said refrigerating casing and opening one into the cold storage room and another into the sharp freeze room and another into the high temperature processing room, air return passages leading to the casing one from the cold storage room and the other from the high temperature processing room, an air outlet passage leading from the sharp freeze room to the cold storage room, and valve means for selectively opening and closing the said air delivery conduits and the said air return passage leading to the casing from the cold storage room and high temperature processing room.

FORD J. CUMMING.